(12) United States Patent
Clare

(10) Patent No.: US 7,104,583 B2
(45) Date of Patent: Sep. 12, 2006

(54) VEHICLE WITH STORAGE/UTILITY SYSTEM

(76) Inventor: Scott Clare, 547 El Pintado Rd., Danville, CA (US) 94526

( * ) Notice: Subject to any disclaimer, the term of this patent is extended or adjusted under 35 U.S.C. 154(b) by 0 days.

(21) Appl. No.: 10/330,686

(22) Filed: Dec. 27, 2002

(65) Prior Publication Data

US 2003/0146638 A1   Aug. 7, 2003

Related U.S. Application Data

(63) Continuation of application No. 09/803,420, filed on Mar. 9, 2001, now Pat. No. 6,499,795, which is a continuation-in-part of application No. 09/426,981, filed on Oct. 26, 1999, now abandoned, which is a continuation of application No. 08/896,392, filed on Jul. 18, 1997, now Pat. No. 5,979,973, which is a continuation-in-part of application No. 08/685,678, filed on Jul. 24, 1996, now abandoned, which is a continuation-in-part of application No. 08/506,893, filed on Jul. 26, 1995, now Pat. No. 5,567,000.

(51) Int. Cl.
*B60R 9/06* (2006.01)

(52) U.S. Cl. ...................... 296/37.6; 224/404
(58) Field of Classification Search ............... 296/37.6, 296/183, 183.1; 224/404
See application file for complete search history.

(56) References Cited

U.S. PATENT DOCUMENTS

| | | | |
|---|---|---|---|
| 322,965 A | 7/1885 | Powell | |
| 527,339 A | 10/1894 | Lins | |
| 912,430 A | 2/1909 | Smither | |
| 1,295,372 A | 2/1919 | Riddle et al. | |
| 1,490,657 A | 4/1924 | Botella | |
| 1,857,061 A | 5/1932 | McGloughlin | 296/37.2 |
| 1,990,757 A | 2/1935 | Stiles | 296/28 |
| 2,327,410 A | 8/1943 | Ferguson | 211/13 |
| 2,380,557 A | 7/1945 | Terry | 296/24 |
| D143,990 S | 2/1946 | Powers | |
| 2,426,772 A | 9/1947 | Holan, Jr. et al. | 296/24 |
| 2,455,417 A * | 12/1948 | Holan et al. | 296/37.6 |
| 2,530,578 A | 11/1950 | Hotop | 296/24 |
| 2,616,754 A * | 11/1952 | Stahl | 296/37.6 |
| 2,622,400 A | 12/1952 | Greer | 60/97 |
| 2,662,793 A | 12/1953 | Lindsay | 296/28 |
| 2,722,352 A | 11/1955 | Dehnel | 224/42.42 |
| 2,772,913 A | 12/1956 | Holan et al. | 296/28 |
| 2,812,097 A | 11/1957 | Legge | 220/18 |
| 2,893,727 A | 7/1959 | Barnard | |
| 2,901,285 A | 8/1959 | Walker | 296/37 |
| 2,941,837 A | 6/1960 | McCready | 296/37 |
| 2,978,153 A | 4/1961 | Brindle | 224/42.42 |
| 2,992,038 A | 7/1961 | Manganello | 296/36 |
| 3,004,790 A | 10/1961 | Mayer | 296/26 |
| 3,019,047 A | 1/1962 | Ahrens | 296/28 |

(Continued)

FOREIGN PATENT DOCUMENTS

CA            551973           1/1958

(Continued)

OTHER PUBLICATIONS

Douglas, "A low silhouette," 1-3.

(Continued)

*Primary Examiner*—Dennis H. Pedder
(74) *Attorney, Agent, or Firm*—Vinson & Elkins L.L.P.

(57) ABSTRACT

A truck with one or more storage compartments in the bed adjacent the side panels and in which a hinged panel in the side panel or fender allows access to a storage compartment. The side panels maintain the appearance of a conventional pickup truck without storage compartments.

62 Claims, 3 Drawing Sheets

U.S. PATENT DOCUMENTS

| | | | |
|---|---|---|---|
| 3,022,108 A | 2/1962 | Cooley | 296/57 |
| 3,034,823 A | 5/1962 | Himka et al. | 296/28 |
| 3,068,038 A | 12/1962 | Douglass, Jr. | 296/24 |
| 3,082,033 A | 3/1963 | Bosher | 296/26 |
| 3,085,826 A | 4/1963 | Carreau | 296/37 |
| 3,245,713 A | 4/1966 | Ogilvie | 296/24 |
| 3,326,595 A | 6/1967 | Ogilvie | 296/37 |
| 3,449,864 A | 6/1969 | Prost-Dame et al. | 49/477 |
| 3,492,042 A | 1/1970 | Nachtigall, Jr. | 296/24 |
| 3,541,668 A | 11/1970 | Wessells, III et al. | 29/469 |
| 3,596,976 A | 8/1971 | Eitel et al. | 296/24 |
| 3,668,907 A | 6/1972 | Pastva, Jr. | 70/153 |
| 3,727,971 A * | 4/1973 | Sisler | 296/37.6 |
| 3,768,858 A | 10/1973 | Boismier | 296/137 |
| 3,799,605 A | 3/1974 | Silva | 296/23 |
| 3,806,184 A | 4/1974 | Dean | 296/35 |
| 3,826,529 A | 7/1974 | Wood | 296/37 |
| 3,869,873 A | 3/1975 | Thomas | 62/275 |
| 3,891,262 A | 6/1975 | Brunel | 296/3 |
| 4,103,956 A | 8/1978 | Faulstich | 296/10 |
| 4,121,382 A | 10/1978 | Dietrich et al. | 49/334 |
| 4,126,349 A | 11/1978 | Nelson et al. | 296/24 |
| 4,135,761 A * | 1/1979 | Ward | 296/37.6 |
| 4,138,046 A | 2/1979 | De Freze | 224/42.42 |
| 4,139,232 A | 2/1979 | Cerf et al. | 296/63 |
| 4,151,925 A | 5/1979 | Glassmeyer | 220/1.5 |
| 4,194,782 A | 3/1980 | Itoh | 296/65 |
| 4,216,990 A | 8/1980 | Musgrove et al. | 296/213 |
| D257,968 S | 1/1981 | Rice | D12/156 |
| 4,328,988 A * | 5/1982 | Patterson et al. | 296/10 |
| 4,353,111 A | 10/1982 | Gallitzendorfer et al. | 362/80 |
| 4,355,837 A | 10/1982 | Shimizu et al. | 296/37.12 |
| 4,372,429 A | 2/1983 | Marx | 188/322.12 |
| 4,394,100 A | 7/1983 | Sperlich | 410/2 |
| 4,408,751 A | 10/1983 | Dodson et al. | 267/120 |
| 4,422,685 A | 12/1983 | Bonfilio et al. | 296/197 |
| 4,438,964 A | 3/1984 | Peters | 292/216 |
| 4,469,364 A | 9/1984 | Rafi-Zadeh | 296/37.6 |
| 4,570,986 A | 2/1986 | Sams | 293/117 |
| 4,632,446 A | 12/1986 | Douglass | 296/37.6 |
| 4,643,314 A | 2/1987 | Kidd | 206/600 |
| 4,685,695 A | 8/1987 | LeVee | 280/423 |
| 4,705,317 A | 11/1987 | Henri | 296/37.6 |
| 4,733,898 A | 3/1988 | Williams | 296/24 |
| 4,761,917 A | 8/1988 | Knecht et al. | 49/477 |
| 4,762,449 A | 8/1988 | St. Pierre et al. | 410/107 |
| 4,770,458 A | 9/1988 | Burke et al. | 296/3 |
| 4,773,242 A | 9/1988 | Smith | 70/455 |
| 4,776,481 A | 10/1988 | Kidd | 220/22 |
| 4,789,195 A | 12/1988 | Fletcher | 296/37.6 |
| 4,805,347 A | 2/1989 | Smith | 49/477 |
| 4,823,923 A | 4/1989 | Moyer | 188/376 |
| 4,830,242 A | 5/1989 | Painter | 224/42.32 |
| 4,861,096 A * | 8/1989 | Hastings | 296/183 |
| 4,900,083 A | 2/1990 | Kumasaka et al. | 296/197 |
| 4,911,487 A | 3/1990 | Rachocki | 292/216 |
| 4,917,279 A | 4/1990 | Brow et al. | 224/42.14 |
| 4,917,430 A | 4/1990 | Lawrence | 296/376 |
| 4,936,624 A | 6/1990 | West | 296/37.6 |
| 4,971,092 A | 11/1990 | Parry et al. | 137/351 |
| 4,981,320 A | 1/1991 | Bowman | 296/57.1 |
| 4,998,758 A | 3/1991 | Kowalczyk et al. | 292/201 |
| 5,048,888 A | 9/1991 | Willy et al. | 296/189 |
| 5,088,636 A | 2/1992 | Barajas | 224/281 |
| 5,090,105 A | 2/1992 | DeRees | 29/469 |
| 5,090,770 A | 2/1992 | Heinrichs et al. | 297/347 |
| 5,098,148 A | 3/1992 | Hoban | 296/66 |
| 5,123,691 A | 6/1992 | Ginn | 296/37.1 |
| 5,125,710 A | 6/1992 | Gianelo | 296/37.1 |
| 5,152,030 A | 10/1992 | Cogo | 16/86 |
| 5,172,519 A | 12/1992 | Cooper | 49/400 |
| 5,188,414 A | 2/1993 | Burnham et al. | 296/37.6 |
| 5,190,337 A | 3/1993 | McDaniel | 296/3 |
| 5,197,775 A | 3/1993 | Reeber | 296/37.12 |
| 5,207,469 A | 5/1993 | Rossi | 296/37.6 |
| 5,233,849 A | 8/1993 | Forbers | 70/256 |
| 5,251,729 A | 10/1993 | Nehl et al. | 188/299 |
| 5,253,917 A | 10/1993 | Brueggemann | 296/218 |
| 5,267,773 A | 12/1993 | Kalis, Jr. et al. | 296/183 |
| 5,267,776 A | 12/1993 | Fromson | 297/232 |
| 5,288,124 A | 2/1994 | Ward | 296/183 |
| 5,303,969 A | 4/1994 | Simnacher | 296/37.6 |
| 5,316,358 A | 5/1994 | Payne et al. | 296/37.6 |
| 5,324,089 A | 6/1994 | Schlachter | 296/37.5 |
| 5,339,488 A | 8/1994 | Maass | 15/250.01 |
| 5,361,542 A | 11/1994 | Dettloff | 49/477.1 |
| 5,383,703 A | 1/1995 | Irvine, III | 296/181 |
| 5,385,378 A | 1/1995 | Hakamada et al. | 296/37.12 |
| 5,390,974 A | 2/1995 | Theodorakakos | 296/146.9 |
| 5,421,645 A | 6/1995 | Young | 312/108 |
| 5,439,152 A | 8/1995 | Campbell | 224/405 |
| 5,449,213 A | 9/1995 | Kiley et al. | 296/56 |
| 5,458,353 A | 10/1995 | Hanemaayer | 280/164.1 |
| 5,476,301 A | 12/1995 | Berkich | 296/3 |
| 5,489,104 A | 2/1996 | Wolff | 277/34 |
| 5,498,048 A | 3/1996 | Shelby, Jr. | 296/24.1 |
| 5,498,049 A | 3/1996 | Schlachter | 296/37.6 |
| 5,518,158 A | 5/1996 | Matlack | 224/402 |
| 5,535,931 A | 7/1996 | Barlow et al. | 224/404 |
| 5,567,000 A | 10/1996 | Clare | 296/37.6 |
| 5,573,685 A | 11/1996 | Boncaldo | 219/201 |
| 5,575,525 A | 11/1996 | Walworth, Jr. et al. | 296/183 |
| 5,615,922 A | 4/1997 | Blanchard | 296/37.6 |
| 5,628,540 A | 5/1997 | James | 296/3 |
| 5,636,890 A | 6/1997 | Cooper | 296/37.1 |
| 5,660,427 A | 8/1997 | Freeman et al. | 296/190 |
| 5,667,268 A | 9/1997 | Bump | 296/100 |
| 5,709,309 A | 1/1998 | Gallagher et al. | 220/229 |
| 5,743,584 A * | 4/1998 | Lance et al. | 296/37.6 |
| 5,810,426 A | 9/1998 | Bovellan | 296/189 |
| 5,816,630 A | 10/1998 | Bennett et al. | 292/341.17 |
| 5,826,931 A | 10/1998 | Perlman et al. | 296/37.6 |
| 5,833,295 A | 11/1998 | Farlow, Jr. | 296/24.1 |
| 5,845,952 A | 12/1998 | Albertini et al. | 296/37.6 |
| 5,845,954 A | 12/1998 | DePue | 296/37.12 |
| 5,904,389 A | 5/1999 | Vaishnav et al. | 296/37.1 |
| 5,921,604 A | 7/1999 | Yu et al. | 296/56 |
| 5,944,376 A | 8/1999 | Buchanan, Jr. | 296/146.4 |
| 5,979,973 A | 11/1999 | Clare et al. | 296/189 |
| 6,003,923 A | 12/1999 | Scott et al. | 296/37.6 |
| 6,102,474 A | 8/2000 | Daley | 296/836 |

FOREIGN PATENT DOCUMENTS

| | | |
|---|---|---|
| DE | 3636789 A1 | 5/1988 |
| DK | 13161 | 5/1910 |
| FR | 608961 | 8/1926 |
| FR | 716091 | 12/1931 |
| FR | 1181569 | 6/1959 |
| FR | 2592344 A | 7/1987 |
| GB | 207524 | 7/1924 |
| JP | 57151429 | 9/1982 |
| JP | 1119445 | 5/1989 |
| JP | 4248033 | 3/1992 |
| JP | 4221279 | 8/1992 |
| WO | WO 97/05008 | 2/1997 |

OTHER PUBLICATIONS

Advertisement in Capitol Buick.Pontiac.GMC "Truck Talk," vol. 2, No. 1, Summer 2001.

Advertisement on p. 6 of Brochure entitled "Avalanche—Like a Rock," 2000.

U.S. Appl. No. 09/083,422.

Parker, "1969 VW Transporter is gussied up 'Inga'," The Washington Times, Apr. 26, 2002.

L'Auto Carrosscerie, Apr. 1937.

"Report of Defendant's Expert Witness Richard D. Grauer", In the United States District Court for the Eastern District of Texas Marshall Division, Jan. 13, 2004.

"Expert Report and Declaration of Larry Simnacher Regarding Non-Infringement", In the United States District Court for the Eastern District of Texas Marshall Division, received Jan. 28, 2004.

"Expert Report and Declaration of Larry Simnacher", In the United States District Court for the Eastern District of Texas Marshall Division, Jan. 28, 2004.

"Opening Expert Report of Dr. Ed Akin Regarding Infringement", In the United States District Court for the Eastern Division of Texas Marshall Division, Jan. 13, 2004.

"Supplemental Expert Report of Dr. Ed Akin", In the United States District Court for the Eastern District of Texas Marshall Division, Feb. 16, 2004.

"Rebuttal Expert Report of Dr. Ed Akin Regarding Validity", In the United States District Court for the Eastern District of Texas Marshall Division, Jan. 28, 2004.

"Expert Witness Report by John F. Witherspoon", In the United States District Court for the Eastern District of Texas Marshall Division, Feb. 19, 2004.

"Expert Report of Walter Bratic, Jan. 28, 2004", In the United States District Court for the Eastern District of Texas Marshall Division, Jan. 28, 2004.

"Expert Report of Larry W. Evans Pursuant to Rule 26(a)(2)(B), Fed. R. Civ. P.", In the United States District Court for the Eastern District of Texas Marshall Division, Jan. 13, 2004.

"Expert Report of James T. Davis", In the United States District Court for the Eastern District of Texas Marshall Division, Jan. 13, 2004.

"Supplemental Expert Report of Dr. Ed Akin Regarding Infringement by Royal", In the United States District Court for the Eastern District of Texas Marshall Division, Feb. 16, 2004.

"Expert Report of Richard J. Toner", In the United States District Court for the Eastern District of Texas Marshall Division, Jan. 13, 2004.

"Plaintiffs' Opening Brief on Claim Construction", In the United States District Court for the Eastern District of Texas Marshall Division, Oct. 9, 2003.

"Ford Motor Company's Claim Construction Brief", In the United States District Court for the Eastern District of Texas Marshall Division, Oct. 24, 2003.

"Defendant General Motors Corporation's Claim Construction Brief", In the United States District Court for the Eastern District of Texas Marshall Division, Oct. 24, 2003.

"Plaintiffs' Reply Brief on Claim Construction", In the United States District Court for the Eastern District of Texas Marshall Division, Nov. 10, 2003.

"Claim Construction Order", In the United States District Court for the Eastern District of Texas Marshall Division, Dec. 6, 2003.

"General Motors Corporation's Motion for Summary Judgment of Invalidity of U.S. Pat. No. 6,499,795", In the United States District Court for the Eastern District of Texas Marshall Division, Aug. 5, 2003.

"Plaintiffs' Response to GM's Motion for Summary Judgment of Invalidity of U.S. Pat. No. 6,499,795", In the United States District Court for the Eastern District of Texas Marshall Division, Aug. 27, 2003.

"Reply in Support of General Motors Corporation's Motion for Summary Judgment of Invalidity of U.S. Patent No. 6,499,795", In the United States District Court for the Eastern District of Texas Marshall Division, Sep. 3, 2003.

"Ford Motor Company's Motion for Summary Judgment of Non-Infringement", In the United States District Court for the Eastern District of Texas Marshall Division, Feb. 20, 2004.

"General Motors Corporation's Supplemental Brief for Its Summary Judgment Motion and In Opposition to Plaintiffs' Request for Summary Judgment", In the United States District Court for the Eastern District of Texas Marshall Division, Dec. 31, 2003.

"Plaintiff's Further Supplemental Brief In Further Opposition to GM's Motion for Summary Judgment of Invalidity of U.S. Patent No. 6,499,795", In the United States District Court for the Eastern District of Texas Marshall Division, Jan. 28, 2004.

"Order Denying General Motors Corporation's Motion for Summary Judgment", In the United States District Court for the Eastern District of Texas Marshall Division, Feb. 10, 2004.

"Record of Invention of James George Gobart" received Aug. 18, 1994.

U.S. Appl. No. 09/426,981.

U.S. Appl. No. 09/512,018.

* cited by examiner

VEHICLE WITH STORAGE/UTILITY SYSTEM

BACKGROUND OF THE INVENTION

This application is a continuation of U.S. Ser. No. 09/803,420, filed Mar. 9 2001, now U.S. Pat. No. 6,499,795, which is a continuation-in-part of U.S. Ser. No. 09/426,981, filed Oct. 26, 1999 now abandoned, which is a continuation of U.S. Ser. No. 08/896,392, filed Jul. 18, 1997, now U.S. Pat. No. 5,979,973, which is a continuation-in-part of U.S. Ser. No. 08/685,678, filed Jul. 24, 1996, now abandoned, which is a continuation-in-part of U.S. Ser. No. 08/506,893, filed Jul. 26, 1995, now U.S. Pat. No. 5,567,000.

Pickup trucks have long been a means for transporting and/or storing tools, materials, etc. for various trades, such as plumbing, electrical, construction, repair, etc. While conventional tool boxes, which generally extend across the pickup bed, are a convenient tool storage approach, such take up a great deal of space and thus reduce the carrying capacity. Also, the conventional pickup beds have been removed and replaced with utility type beds of various types, such as exemplified by U.S. Pat. No. 5,267,773 issued Dec. 7, 1993 to G. Kalis, Jr. et al. In addition, the pickup truck body and/or beds have been modified to provide storage/utility space, such as exemplified by U.S. Pat. No. 4,917,430 issued Apr. 17, 1990 to M. A. Lawrence.

While these prior storage/utility arrangements have been satisfactory for their intended purpose, such are an attraction for theft as well as having an appearance of a utility bed. Thus, there has been a need for a storage/utility system for pickup truck beds which does not alter the bed's external appearance or significantly reduce the interior size of the bed, thereby reducing the tool theft problem while providing space for hidden storage without significant reduction of the bed's carrying capacity.

This need has been filled by the present invention which involves the conversion of a conventional pickup truck bed into a storage/utility bed without altering the external appearance of the bed and without significant reduction in the carrying capacity thereof. This is accomplished by providing storage adjacent the wheel well area, and along the length of the bed, and providing the fender/side panel of the bed with a hinge and latch arrangement whereby the fender/side panel can be raised to expose the storage area, or closed and latched to conceal the storage area. Thus, the pickup can be used for pleasure or work without the appearance of its storage/utility capability, and can be parked in areas where theft would likely occur from conventional tool boxes or utility

SUMMARY OF THE INVENTION

It is an object of the present invention to provide a storage/utility system for conventional pickup truck beds.

A further object of the invention is to provide a method for converting a standard pickup truck bed into a storage/utility bed.

A further object of the invention is to provide a pickup truck bed with storage/utility capability without a significant reduction in the carrying capacity thereof.

Another object of the invention is to provide a pickup bed with storage/utility capability without altering the external appearance of the bed.

Another object of the invention is to provide a pickup bed with a hidden storage/utility system wherein the fender/side panel of the bed is hinged to allow access to the storage/utility area.

Another object of the invention is to reduce theft potential from a storage/utility bed of pickup trucks, etc. by providing hidden storage/utility areas in the bed without altering the external appearance of the bed.

Other objects and advantages of the invention will become apparent from the following description and accompanying drawings. The invention involves a storage/utility system for pickup truck beds that can be installed in any fleet side bed without altering the bed's appearance. The storage/utility system is installed in the wheel well area of the bed, and uses hinges to open and close the fender/side panel of the bed. The fender/side panel is provided with a latching and lock mechanism. Since the storage/utility system only involves the area of bed adjacent the wheel wells, it does not significantly reduce the carrying capacity of the bed. By providing a hidden storage/utility system for a pickup truck bed, the potential of theft therefrom is substantially reduced since the unaltered appearance of the bed's external surfaces would not lead one to a realization that it contained tools, etc.

Certain embodiments of the present disclosure may therefore be described as storage/utility systems for a bed adapted to be mounted on wheels and having side panels, including a storage box mounted on at least one side of the bed; at least a portion of a side panel on at least one side of the bed being hinged at an upper portion thereof, whereby the hinged portion can be raised to expose an interior of the storage box and lowered to cover the interior of the storage box; and a lock mechanism mounted to releasably secure the side panel. In the described embodiment, the bed preferably includes a pair of wheel wells, and the storage box covers a wheel well and extends forward and/or rearward from the wheel well.

A preferred storage/utility system has a storage box with a height less than a height of the bed, and in certain embodiments, a lock and latch mechanism is mounted to the storage box and may include a plurality of latch members adapted to cooperate with latch members secured to the side panel. It is also an aspect of the present disclosure that a storage box may be provided with at least one shelf therein. In certain embodiments, a portion of a side panel extends substantially an entire length of the bed, and the storage system is formed by a pair of vertical cuts in the overall side panel of the bed adjacent ends of the overall side panel, and is constructed such that when the side panel is lowered the storage box is hidden and the appearance of the bed is not altered.

In certain embodiments of the disclosure, each side of a bed may be provided with a storage box, a lock and latch mechanism, and a hinged side panel. It is also a preferred embodiment that when each side of a bed includes a storage box, that the storage boxes in the bed are positioned in excess of four (4) feet from each other. Various embodiments of the disclosure would also include the described storage/utility systems in which the beds are mounted over the wheels of a pickup, trailer or truck.

In certain embodiments an invention disclosed herein may be described as a method for converting a conventional bed of a vehicle or trailer having wheel wells and side panels into a storage/utility bed without altering the external appearance of the bed. The method would include removing a section of the side panel on at least one side of the bed; hinging the removed side panel section at an upper end thereof to the bed, whereby the side panel section can be raised and lowered; forming storage means along at least one side of the bed so as to cover the wheel wells, whereby raising of the side panel section exposes the interior of the storage means; and providing latching means for side panel section.

In the practice of the described method, removing a section of the side panel may be carried out by making a pair of vertical cuts through the side panel and removing any connection to the bed of the side panel along the lower end thereof. The removed side panel may be hinged, and in certain embodiments a full length hinge is used. The method may further include providing a latch by positioning a plurality of latch mechanisms along the bed and along the side panel section, and providing the storage means with a latch release mechanism and a lock may also be provided. In certain embodiments the latching mechanism is formed to include a release mechanism, preferably by positioning the release mechanism at the rear of the storage means, and connecting the plurality of latch mechanisms to the release mechanism.

In certain embodiments the described method include providing a storage means, a hinged side panel section, and a latching means on each side of the bed, and positioning the storage means in the bed such that there is a space of about four feet between the storage means, and forming the storage means such that the height thereof is less than the height of the bed. Such methods may further include hinging the side panel section such that the hinge is hidden from a side view of the bed, preparing and painting the storage means and exposed surfaces of the side panel section and adjacent bed surfaces to correspond to the paint of the bed, and/or providing the storage means with internal shelving.

Certain embodiments of the invention may also be described as a method for fabricating a storage/utility bed without altering the external appearance thereof, including forming a bed to include a storage box on each side of the bed extending along substantially the length of the bed; forming hinged side panels on the bed such that same can be opened and closed, to expose or cover the storage boxes, and providing latching and lock means for the side panels.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

The present invention involves a storage/utility system for a pickup truck bed and a method for conversion of a conventional pickup truck bed to a storage/utility bed without altering the external appearance of the bed, and without a significant reduction in the carrying capacity of the bed. The present invention reduces the theft potential from storage/utility beds by eliminating the appearance of such beds. The invention utilizes lost space adjacent the wheel wells of the bed while maintaining the space between the wheel wells. As known, the space between the wheel wells of a conventional pickup truck bed is slightly over four (4) feet and the conventional pickup truck beds have a length of eight (8) feet plus, wherein sheets of 8 ft. by 4 ft. material, such as plywood, etc. can be carried between the wheel wells. However, the space in front and back of the wheel well is generally considered lost space for large items until material has been stacked above the height of the wheel wells. Thus, by utilizing the area in front, back, and above the wheel wells as storage/utility space, the overall storage/carrying capacity of the bed is increased between the outer fender and inner fender of a stock pickup by removing the inner fender. Here, the term storage/utility space is defined as that space in which tools, such as vices, saws, etc. can be stored or mounted for use, and in which shelves can be secured for retaining parts, etc.

Figure 1:
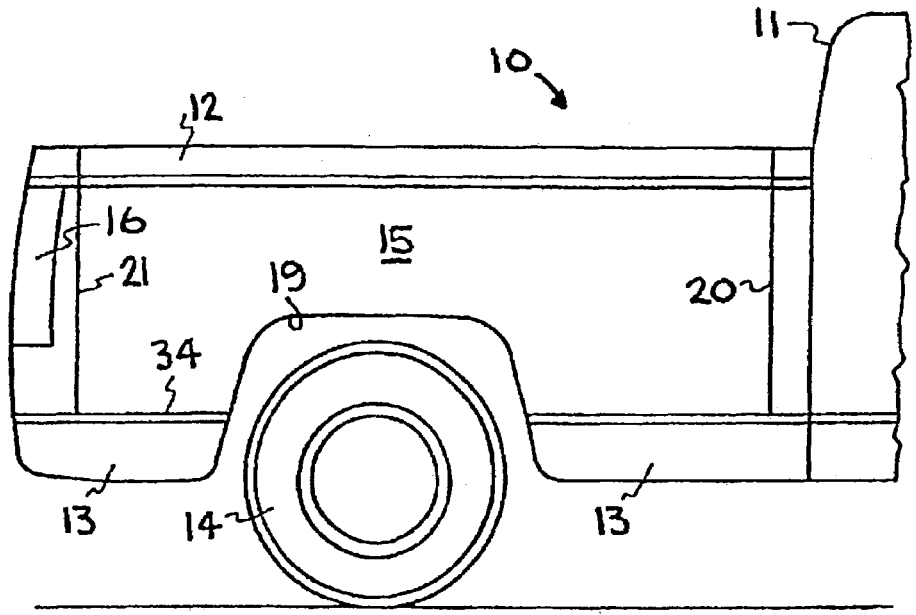
FIG. 1 is a view of a side of a pickup truck bed which has been modified to incorporate the storage/utility system under the closed fender/side panel of the bed in accordance with the present invention.

By the present invention, a conventional pickup truck bed is converted to a storage/utility bed, whereas the conventional installation of storage/utility beds involve the replacement of the conventional bed, thus the cost of conversion compared to the cost of the conventional bed replacement is substantially less. Basically, the conversion involves cutting each fender/side panel (hereinafter called side panel) vertically in two places and along the upper length thereof, on an inner surface of the side panel, as described in detail hereinafter, disconnecting the lower length of the side panels from the bed frame, hinging the side panel along the upper length, providing braces on the side panels, installing a latching mechanism along the lower length of the side panels, providing a key lock for the latching mechanism, installing a storage structure or box over the wheel wells along each side of the bed, securing shelving to the storage box, and painting the cut areas and the storage box to correspond to the color of the bed. Upon completion of the conversion, from a side view, the only difference between the converted bed and a nonconverted bed are two vertical lines or small spaces, one just back of the front of the bed and one just forward of the taillight section of the bed, where the side panel is cut, as illustrated in FIG. 1. The hinge for each side panel is located on an inner area of the side panel so as not to be exposed to one viewing the bed from an external side position. Thus, one would not readily recognize the modification to the bed, and therefore those with intent to steal tools, etc. would not recognize the hidden storage arrangement.

Figure 2:
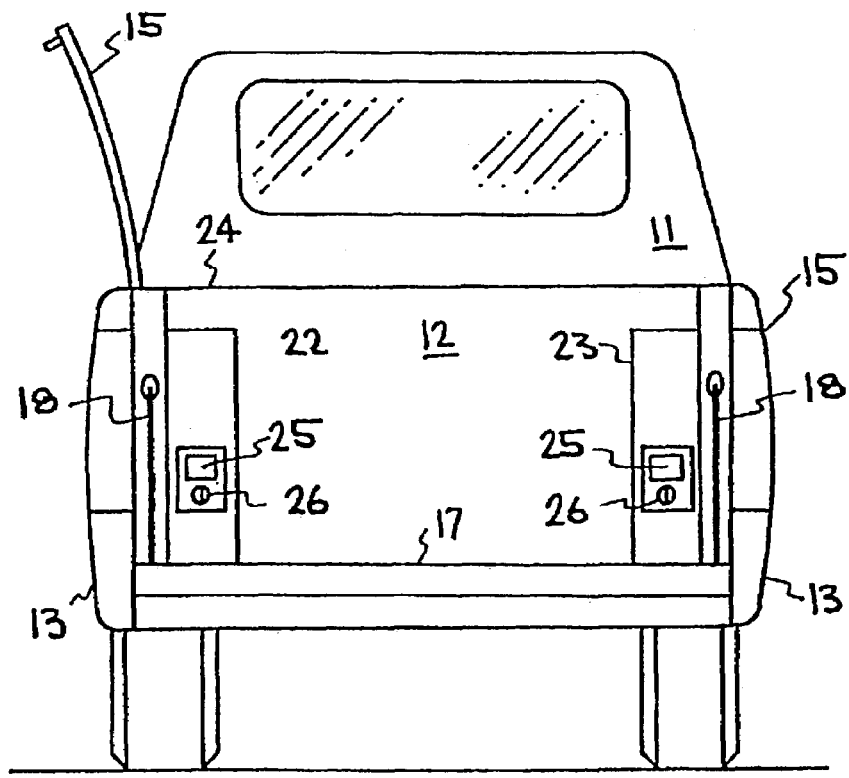
FIG. 2 is an end view of the pickup truck bed of FIG. 1 showing the left fender/side panel open, the right fender/side panel closed, the tail gate open, and the storage boxes and lock mechanism within the bed.

Referring now to the drawings, FIGS. 1 and 2 illustrate a conventionally appearing pickup truck generally indicated at 10 having a cab 11, bed 12, frame or undercarriage 13, and wheels 14. The bed 12 is mounted on frame or undercarriage 13 and includes side panels 15, a taillight arrangement 16, a hinged tailgate 17 with stop mechanisms 18, and wheel wells 19. However, the bed 12 of FIGS. 1 and 2 has been modified in accordance with the present invention, with the only indication of such modification being the cuts, small spaces, or lines 20 and 21 in the side panels 15, as shown in FIG. 1, with the side panel being closed. Note that in this embodiment the side panels 15 terminate adjacent the frame or undercarriage 13.

Figure 3:
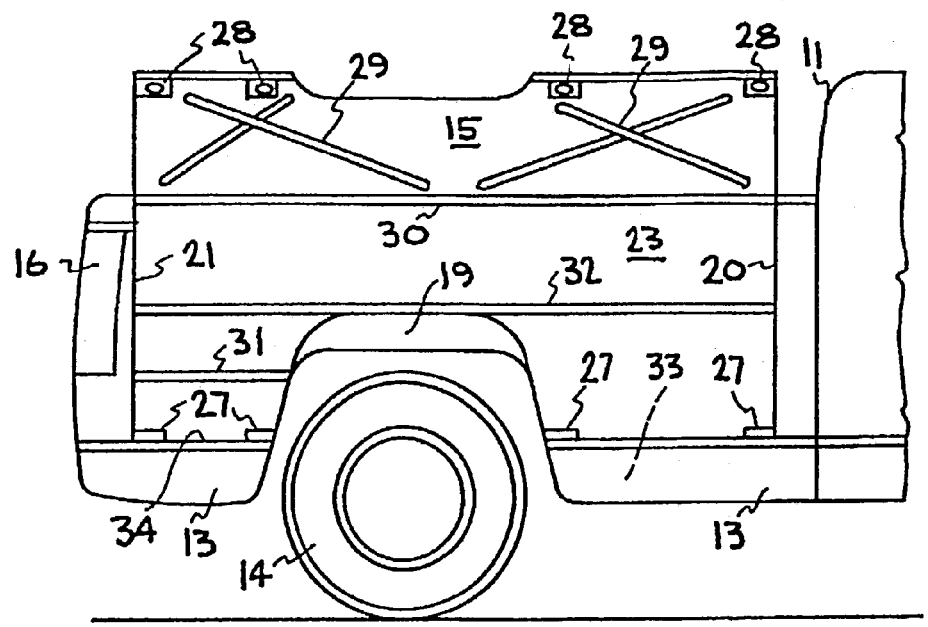
FIG. 3 is a view of an embodiment of the storage/utility system of the FIG. 1 pickup truck bed with the fender/side panel raised to illustrate the storage bin shelves and latch mechanism.
Figure 4:
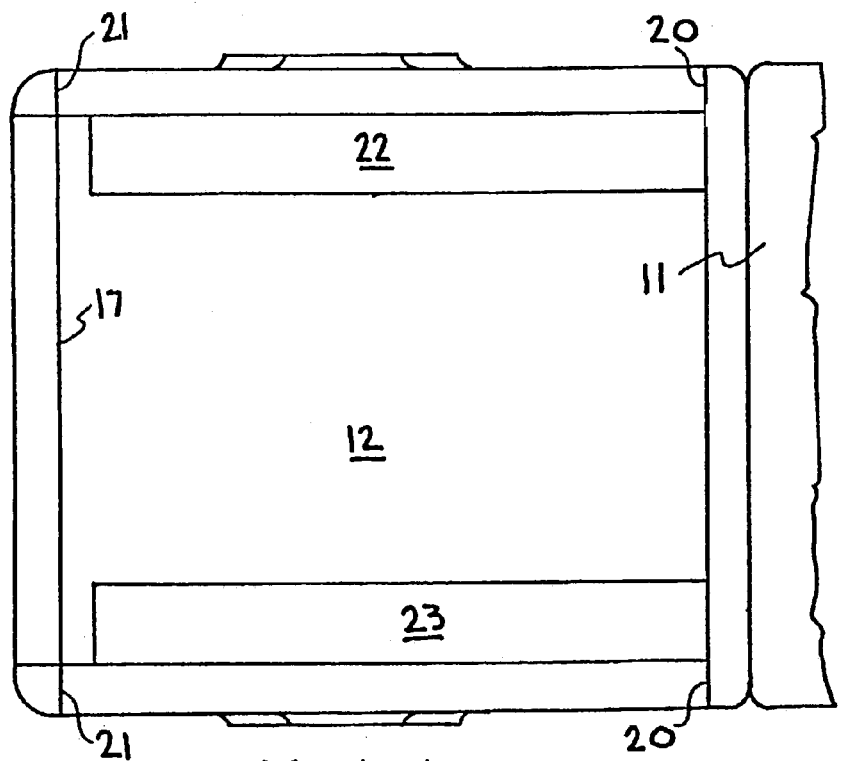
FIG. 4 is a top view of the FIG. 1 pickup truck bed illustrating the storage boxes and fender/side panels, with the tail gate closed.
Figure 5:
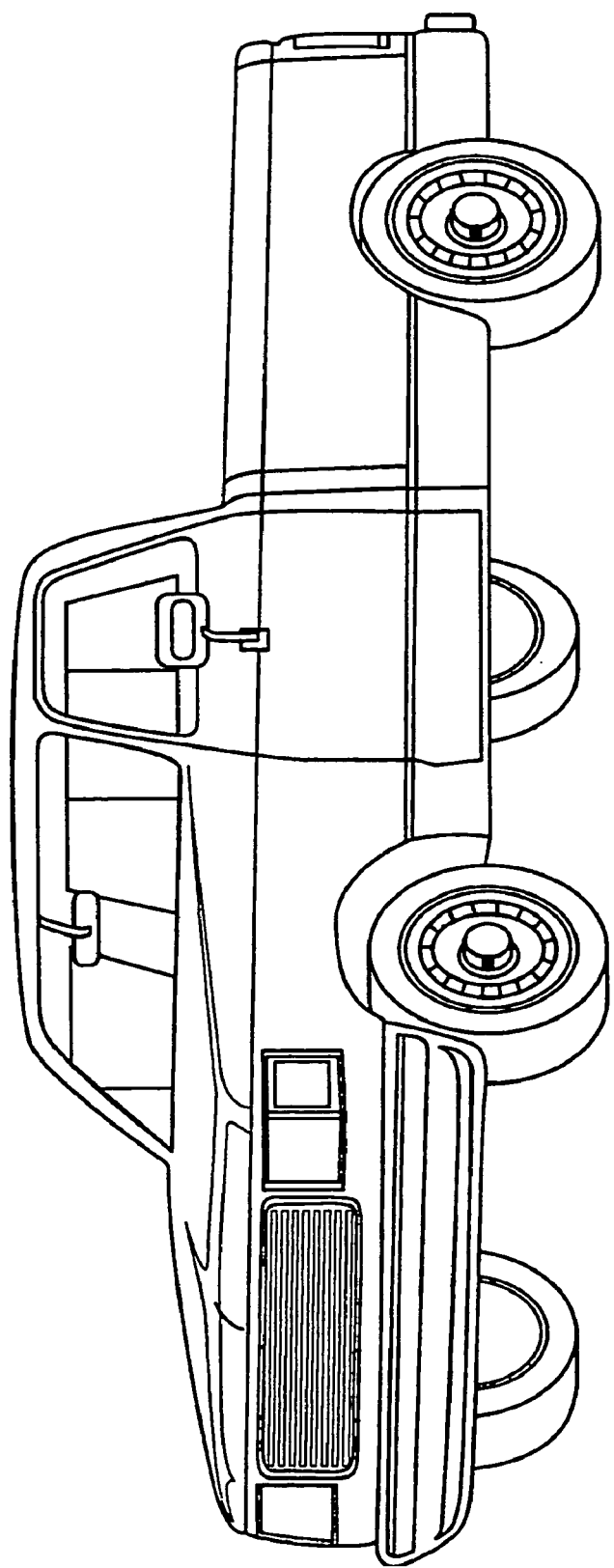
FIG. 5 is a view of a pickup truck having a storage compartment in the bed adjacent the side panel.

As seen in FIGS. 2, 3, and 4, the storage/utility area is provided by storage or structure boxes 22 and 23 mounted within the bed 12 and over the wheel wells 19, the boxes 22 and 23 being constructed to cover the wheel wells 19, but not extend to the top or upper surface 24 of bed 12, and terminate in spaced relation to tailgate 17. A latch mechanism 25 is mounted in the rear of each of boxes 22 and 23, as seen in FIG. 2, and is provided with a key lock 26. The latch mechanism 25 includes latch members 27 located in spaced relation along the bed 12, and which cooperate with corresponding latch members 28 in side panel 15, as show in FIG. 3. While not shown, the latch members 27 are interconnected by a rod or cable which is connected to mechanism 25 which includes a release for members 27.

As seen in FIG. 3, the side panels 15 are each provided with braces 29 and a hinge 30 that extends the full length thereof. Shelves 31 and 32 are secured to the interior of storage or structure boxes 22 and 23, and the area forward of the wheel well 19 forms a storage bin 33. The hinges 30 are located on the interior of the bed 12 and thus not visible from the exterior.

It has thus been shown that the present invention provides a hidden storage/utility arrangement that can be initially built into a pickup truck bed, or a conventional bed can be converted to include the storage/utility arrangement without altering the external appearance of the bed and without a significant reduction in the carrying capacity of the bed. While the invention has been described with respect to a pickup bed, it can be readily incorporated into trailer or full-sized truck beds having side panels without detracting from the appearance of the side panels, except for the two vertical cuts therein.

While a specific embodiment of the storage/utility system of the present invention has been described and illustrated, such is not intended to limit the invention to this embodiment. For certain applications only one storage box my be desired. Beds for pickups, trailers, and trucks are designed with differently constructed side panels and frame/undercarriage arrangements. For example, the bed 12 of FIG. 1 may extend downward to cover the frame or undercarriage 13, as shown, and thus the side panels 15 would include the extended area, or a cut, such as indicated at 34 in FIG. 2, can be made along a desired lower portion of the side panels to eliminate the need for raising the entire side panel when the extended area is part thereof.

Modifications and changes may become apparent to those skilled in the art, and it is intended that the scope of the invention be limited only by the scope of the appended claims.

The invention claimed is:

1. A pickup truck comprising a forward area with contoured sides and a bed; the bed comprising:
    an open cargo area;
    rear wheel wells,
    two opposed side panels which are contoured and generally in line with the contoured sides of the forward area of the pickup truck,
    a floor;
    a first and a second inner wall, which are visually integrated into the bed to define the lateral sides of the open cargo area of the bed, at least the first inner wall being spaced laterally inwardly of its associated side panel; a storage compartment built into the bed between the first inner wall and its associated side panel, the storage compartment being located at least partially above the floor; and
    a hinged panel providing access to the storage compartment,
    the bed being constructed such that the pickup has substantially the external appearance of a pickup without the built-in storage.

2. The pickup truck of claim 1 further comprising a top rail between the first inner wall and the side panel.

3. The pickup truck of claim 2 in which the hinged panel includes at least a portion of the top rail.

4. The pickup truck of claim 2 wherein the hinged panel comprises a hinge located along a portion of the top rail.

5. The pickup truck of claim 1, wherein the first and second inner walls are spaced apart by a distance of at least four feet.

6. The pickup truck of claim 1, wherein the side panels are contoured to substantially match the contoured sides of the forward area.

7. The pickup truck of claim 1, wherein the hinged panel comprises a hinge that is not exposed to an external view of the pickup.

8. The pickup truck of claim 5, 6, or 7, wherein the storage compartment is at least partially above the wheel well.

9. The pickup truck of claim 5, 6, or 7, wherein the storage compartment is at least partially behind the wheel well.

10. The pickup truck of claim 5, 6 or 7, wherein the storage compartment is at least partially above and at least partially behind the wheel well.

11. The pickup truck of claim 5, 6 or 7, wherein the storage compartment is entirely above the floor of the bed.

12. The pickup truck of claim 5, 6 or 7, wherein the wheel well has an inner edge portion, and the inner wall is approximately aligned with the inner edge portion of the wheel well.

13. The pickup truck of claim 5, 6 or 7, wherein the wheel well has an inner edge and the inner wall is positioned near an inner edge of the wheel well.

14. The pickup truck of claim 5, 6 or 7, wherein the bed comprises a forward wall and the storage compartment extends to the forward wall.

15. The pickup truck of claim 5, 6 or 7, wherein the width of the storage compartment at the top of the side panel is less than the width of the wheel well at the level of the floor.

16. The pickup truck of claim 5, 6 or 7, comprising a second storage compartment which is a mirror image of the first and is disposed between the second inner wall and its associated side panel.

17. The pickup truck of claim 16, wherein the first and second inner walls are spaced apart by a distance of at least four feet.

18. The pickup truck of claim 5, 6 or 7, wherein the bed is constructed such that the pickup has substantially the appearance of a pickup without the built-in storage.

19. The pickup truck of claim 5, 6 or 7, wherein the storage compartment contains a storage bin.

20. The pickup truck of claim 5, 6 or 7, wherein the storage compartment is lockable.

21. The pickup truck of claim 5, 6 or 7, wherein the contour of the side panels proximate the cab substantially conforms to the contour of the cab up to substantially the height of the bed.

22. A pickup truck comprising a forward area with contoured sides and a bed; the bed comprising:
    an open cargo area;
    rear wheel wells, two opposed side panels which are contoured and generally in line with the contoured sides of the forward area of the pickup truck, a floor;

a first and a second inner wall, which are visually integrated into the bed to define the lateral sides of the open cargo area of the bed, the inner walls being spaced laterally inwardly of their associated side panels; storage compartments built into the bed between the inner walls and their associated side panels, the storage compartments located at least partially above the floor; and hinged panels providing access to the storage compartments;

the bed being constructed such that the pickup has substantially the external appearance of a pickup without the built-in storage.

23. The pickup truck of claim 22, wherein the hinged panels comprise hinges that are not exposed to an external view of the pickup truck.

24. The pickup truck of claim 22, wherein the bed is constructed such that the pickup truck has substantially the appearance of a pickup truck without the built in storage.

25. The pickup truck of claim 22, 23, or 24 wherein the contour of the side panels proximate the forward area substantially conforms to the contour of the forward area up to substantially the height of the bed.

26. The pickup truck of claim 25, wherein the storage compartments are at least partially above the wheel wells.

27. The pickup truck of claim 25, wherein the storage compartments are at least partially behind the wheel wells.

28. The pickup truck of claim 25, wherein the storage compartments are at least partially above and at least partially behind the wheel wells.

29. The pickup truck of claim 25, wherein the storage compartments are entirely above the floor of the bed.

30. The pickup truck of claim 25, wherein the storage compartments are at least partially above the wheel wells.

31. The pickup truck of claim 29, wherein the storage compartments are at least partially behind the wheel wells.

32. The pickup truck of claim 29, wherein the storage compartments are at least partially above and at least partially behind the wheel wells.

33. The pickup truck of claim 25, wherein the first and second inner walls are spaced apart by a distance of at least four feet.

34. The pickup truck of claim 25, wherein the wheel wells have inner edge portions, and the inner walls are approximately aligned with the inner edge portions of the wheel wells.

35. The pickup truck of claim 25, wherein the wheel wells have inner edges and the inner walls are each positioned near an inner edge of the wheel wells.

36. The pickup truck of claim 25, further comprising top rails between the inner walls and the side panels.

37. The pickup truck of claim 36, in which the hinged panels include at least a portion of the top rails.

38. The pickup truck of claim 36, wherein the hinged panels comprise hinges located along a portion of the top rails.

39. The pickup truck of claim 25, wherein the side panels are contoured to substantially match the contour of the contoured sides of the forward area.

40. The pickup truck of claim 25, wherein the bed comprises a forward wall and the storage compartments extend to the forward wall.

41. The pickup truck of claim 25, wherein the width of the storage compartments at the top of the side panels is less than the width of the wheel wells at the level of the floor.

42. The pickup truck of claim 25, wherein the bed is constructed such that the pickup has substantially the appearance of a pickup without the built-in storage.

43. The pickup truck of claim 25, wherein at least one of the storage compartments contains a storage bin.

44. The pickup truck of claim 25, wherein at least one of the storage compartments is lockable.

45. A pickup truck comprising a forward area with contoured sides and a bed; the bed comprising:

an open cargo area;

rear wheel wells, two opposed side panels which are contoured and generally in line with the contoured sides of the forward area of the pickup truck, top rails;

a floor;

first and second inner walls, which are visually integrated into the bed to define the lateral sides of the open cargo area of the bed, the inner walls being spaced laterally inwardly of their associated side panels; storage compartments built into the bed between the inner walls and their associated side panels, the storage compartments being located at least partially above the floor, at least partially above the wheel wells and at least partially behind the wheel wells; and hinged panels providing access to the storage compartments;

the bed being constructed such that the pickup has substantially the appearance of a pickup without the built-in storage.

46. The pickup truck of claim 45, wherein the hinged panels comprise hinges that are not exposed to an external view of the pickup.

47. The pickup truck of claim 45, wherein the storage compartments are at least partially in front of the wheel wells.

48. The pickup truck of claim 45 wherein the hinged panels comprise hinges located along a portion of the top rails.

49. The pickup truck of claim 45, 46, 47, or 48, wherein the storage compartments are entirely above the floor of the bed.

50. The pickup truck of claim 49, wherein the first and second inner walls are spaced apart by a distance of at least four feet.

51. The pickup truck of claim 49, wherein the wheel wells have inner edge portions, and the inner walls are approximately aligned with the inner edge portions of the wheel wells.

52. The pickup truck of claim 49, wherein the wheel wells have inner edges and the inner walls are each positioned near an inner edge of the wheel wells.

53. The pickup truck of claim 49, wherein the side panels are contoured to substantially match the contoured sides of the forward area.

54. The pickup truck of claim 49, wherein the bed comprises a forward wall and the storage compartments extend to the forward wall.

55. The pickup truck of claim 49, wherein the width of the storage compartments at the top of the side panels is less than the width of the wheel wells at the level of the floor.

56. The pickup truck of claim 49, wherein at least one of the storage compartments contains a storage bin.

57. The pickup truck of claim 49, wherein at least one of the storage compartments is lockable.

58. The pickup truck of claim 49, wherein the contour of the side panels proximate the forward area substantially conforms to the contour of the forward area up to substantially the height of the bed.

59. A pickup truck comprising a forward area with contoured sides and a bed; the bed comprising:
- an open cargo area;
- rear wheel wells,
- two opposed side panels which are contoured to substantially match the contoured sides of the forward area and generally in line with the contoured sides of the forward area of the pickup truck,
- top rails;
- a floor;
- first and second inner walls, which are visually integrated into the bed to define the lateral sides of the open cargo area of the bed, the inner walls being spaced laterally inwardly of their associated side panels; storage compartments built into the bed between the inner walls and their associated side panels, the storage compartments each containing a storage bin located at least partially above the floor, at least partially above the wheel wells and at least partially behind the wheel wells, wherein the width of the storage compartments at the top of the side panels is less than the width of the wheel wells at the level of the floor; and
- hinged panels providing access to the storage bins;
- the bed being constructed such that the pickup has substantially the external appearance of a pickup truck without the built-in storage.

60. The pickup truck of claim 59 wherein the hinged panels comprise hinges located along a portion of the top rails.

61. A pickup truck comprising a forward area with contoured sides and a bed; the bed comprising:
- an open cargo area;
- rear wheel wells,
- two opposed side panels which are contoured to substantially match the contoured sides of the forward area and generally in line with the contoured sides of the forward area of the pickup truck,
- top rails;
- a floor;
- first and second inner walls, which are visually integrated into the bed to define the lateral sides of the open cargo area of the bed, the inner walls being spaced laterally inwardly of their associated side panels; storage compartments built into the bed between the inner walls and their associated side panels, the storage compartments each containing a storage bin located above the floor, at least partially above the wheel wells and at least partially behind the wheel wells, wherein the width of the storage compartments at the top of the side panels is less than the width of the wheel wells; and
- hinged panels providing access to the storage bins;
- the bed being constructed such that the pickup has substantially the external appearance of a pickup without the built-in storage.

62. The pickup truck of claim 61, wherein the hinged panels comprise hinges located along a portion of the top rails.

* * * * *